(12) United States Patent
Huang et al.

(10) Patent No.: US 7,274,622 B1
(45) Date of Patent: Sep. 25, 2007

(54) NONLINEAR TECHNIQUES FOR PRESSURE VECTOR ACOUSTIC SENSOR ARRAY SYNTHESIS

(75) Inventors: Dehua Huang, Portsmouth, RI (US); Roy C. Elswick, Punta Gorda, FL (US)

(73) Assignee: The United States of America represented by the Secretary of the Navy, Washington, DC (US)

( * ) Notice: Subject to any disclaimer, the term of this patent is extended or adjusted under 35 U.S.C. 154(b) by 193 days.

(21) Appl. No.: 11/136,764

(22) Filed: May 23, 2005

(51) Int. Cl.
*G01S 15/00* (2006.01)
(52) U.S. Cl. .................................... 367/105
(58) Field of Classification Search ............. 367/105, 367/13
See application file for complete search history.

(56) References Cited

U.S. PATENT DOCUMENTS 5,930,201 A    7/1999   Cray
6,370,084 B1   4/2002   Cray
6,697,302 B1   2/2004   Cray et al.

OTHER PUBLICATIONS

Cray et al.; Directivity factors for linear arrays of velocity sensors; Jul. 2001; J. Acoust. Soc. Am. 110 (1), Jul. 2001; pp. 324-331.*

* cited by examiner

*Primary Examiner*—Daniel Pihulic
(74) *Attorney, Agent, or Firm*—James M. Kasischke; Jean-Paul A. Nasser; Michael P. Stanley

(57) ABSTRACT

The present invention presents a method for use with an acoustic sensor array comprised of a number of pressure-vector sensors capable of sensing the acoustic scalar field and acoustic vector field of an acoustic wave. The method is a signal processing technique that utilizes nonlinear processing of pressure-vector sensor signals in the acoustic sensor array. The method involves the steps of receiving the sensor output values, processing the output values using a non-linear algorithm to create a mathematical series of values, transforming the series, applying weighting to the series and performing a summation of the values in the series to calculate the array directivity response. The array directivity response can then be further processed where the array is part of a sonar system.

13 Claims, 6 Drawing Sheets

NONLINEAR TECHNIQUES FOR PRESSURE VECTOR ACOUSTIC SENSOR ARRAY SYNTHESIS

STATEMENT OF GOVERNMENT INTEREST

The invention described herein may be manufactured and used by or for the Government of the United States of America for governmental purposes without the payment of any royalties thereon or therefore.

CROSS REFERENCE TO OTHER RELATED APPLICATIONS

Not applicable.

BACKGROUND OF THE INVENTION (1) Field of the Invention

The present invention relates generally to signal processing, and more particularly to a new method and apparatus for processing signals received from an array of acoustic pressure-vector sensors using a non-linear processing method.

(2) Description of the Prior Art

An acoustic wave is distinguished by both scalar (pressure) and vector (velocity) fields. Detection of acoustic waves by sensors was initially limited to pressure sensors capable of detecting only the scalar field of acoustic waves. For underwater acoustic detection applications, such as sonar, hydrophones are the pressure sensor of choice, and are often used in arrays of multiple hydrophones.

The majority of acoustic sensor arrays for use in underwater acoustic wave detection employ acoustic pressure sensors, such as hydrophones, and are designed for additive processing of the pressure sensor signals. Some acoustic sensor arrays employing acoustic pressure sensors have been designed for non-linear processing of the pressure sensor signals. The benefit of this type of processing, however, is limited when using only pressure sensors because no acoustic wave vector field information is involved in the array signal processing. A significant drawback to the conventional additive pressure sensor type of acoustic sensor array is the inability to achieve a narrow acoustic beam width without having a large acoustic aperture, particularly where the beam width becomes wider as the acoustic frequency goes lower.

There has been a progression in acoustic wave detection technology with the advent of acoustic vector sensors. Tri-axial acoustic vector sensors measure all three Cartesian components of the vector field of acoustic waves. With the development of acoustic vector sensor technology, it is now possible to combine an acoustic vector sensor with a pressure sensor to form a pressure-vector sensor in order to measure and process the information carried by both the scalar and vector field of an acoustic wave simultaneously.

A single pressure-vector sensor element has an omni-directional directivity for the pressure sensor and a dipole directivity in each axis of a three dimensional space for the vector sensor. A single pressure-vector sensor element provides limited advantages over a single pressure sensor element. However, an array of multiple pressure-vector sensors, properly arranged, can exhibit superior performance over an array of multiple pressure sensors with regard to the reduction of unwanted noise and noise source location. In particular, the use of pressure-vector sensors can significantly reduce the acoustic aperture size of the array if the signals from the pressure-vector sensors are processed correctly.

What is needed is a method for processing signals from an acoustic pressure-vector sensor array that is independent of acoustic frequency and does so for an array having a relatively small acoustic aperture.

SUMMARY OF THE INVENTION

It is a general purpose and object of the present invention to process sensor signals of an acoustic sensor array to achieve narrow acoustic beam width that is independent of frequency and does so for an array having a relatively small acoustic aperture.

This object is accomplished in accordance with the present method through the use of an acoustic sensor array comprised of a number of pressure-vector sensors capable of sensing the acoustic scalar field and acoustic vector field, and a signal processing technique that utilizes nonlinear processing of pressure-vector sensor signals in the acoustic sensor array. The method involves the steps of receiving the sensor output signals, processing the output signals using a non-linear algorithm to create a series of values, mathematically transforming the series, applying weighting to the series and performing a summation of the series to calculate the array directivity response. The array directivity response can then be beam formed and can be further processed into the energy detector component of a sonar system.

DESCRIPTION OF THE PREFERRED EMBODIMENT

Figure 1:
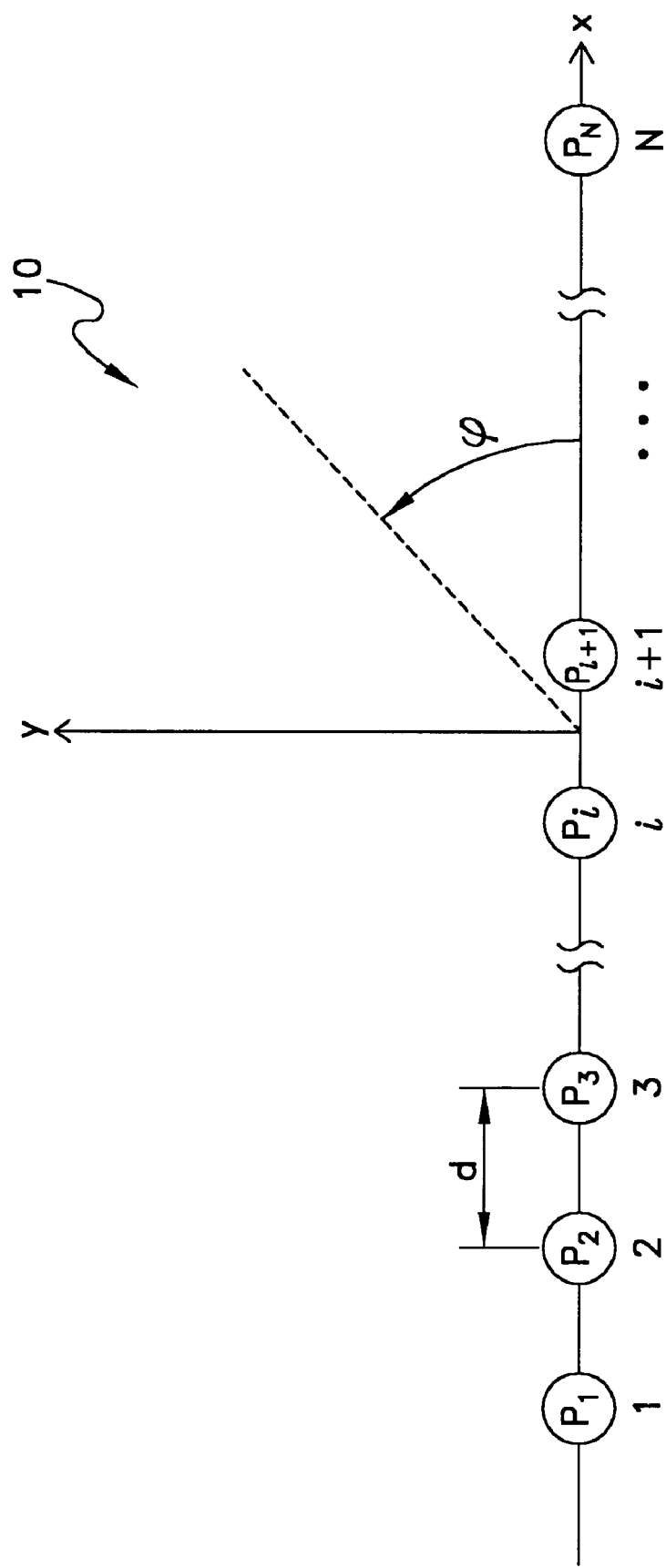
FIG. 1 illustrates a pressure sensor line array.

Referring now to FIG. 1 there is illustrated a line array 10 of N pressure sensors $P_1$ to $P_N$ along a spatial axis labeled x. The angle, $\phi$, is the spatial angle measured away from the x axis used to define the incident direction of an acoustic plane wave originating from a far field source. In the prior art, the conventional method of calculating the array directivity of array 10 is to first define the variable X as:

$$X = 0.5kd \cos(\phi)$$

where k is the wave number, which is $2*\pi*f/c$, where f is the frequency, and c is the sound speed in the medium, which could be air or water, and d is the separation distance between the neighboring sensor elements. The variable X is proportional to the spatial phase of the output signal of the individual pressure sensors $P_1$ to $P_N$. The next step is to define a mathematical series of values corresponding to the number of pressure sensors as:

[1, cos X, cos 2X, cos 3X, . . . , cos((N−1)X)]

The next step is to perform weighting or shading on the series such as Dolph-Chebyshev, Taylor, Gaussian or Bino mial. The final step is to perform a summation of the series of weighted values:

$$D(\varphi) = \left| \sum_{n=0}^{N-1} An \cos nX \right|$$

where $A_n$ represents the shading coefficient of the N weighted values, and $D(\phi)$ is the array directivity.

Figure 2:
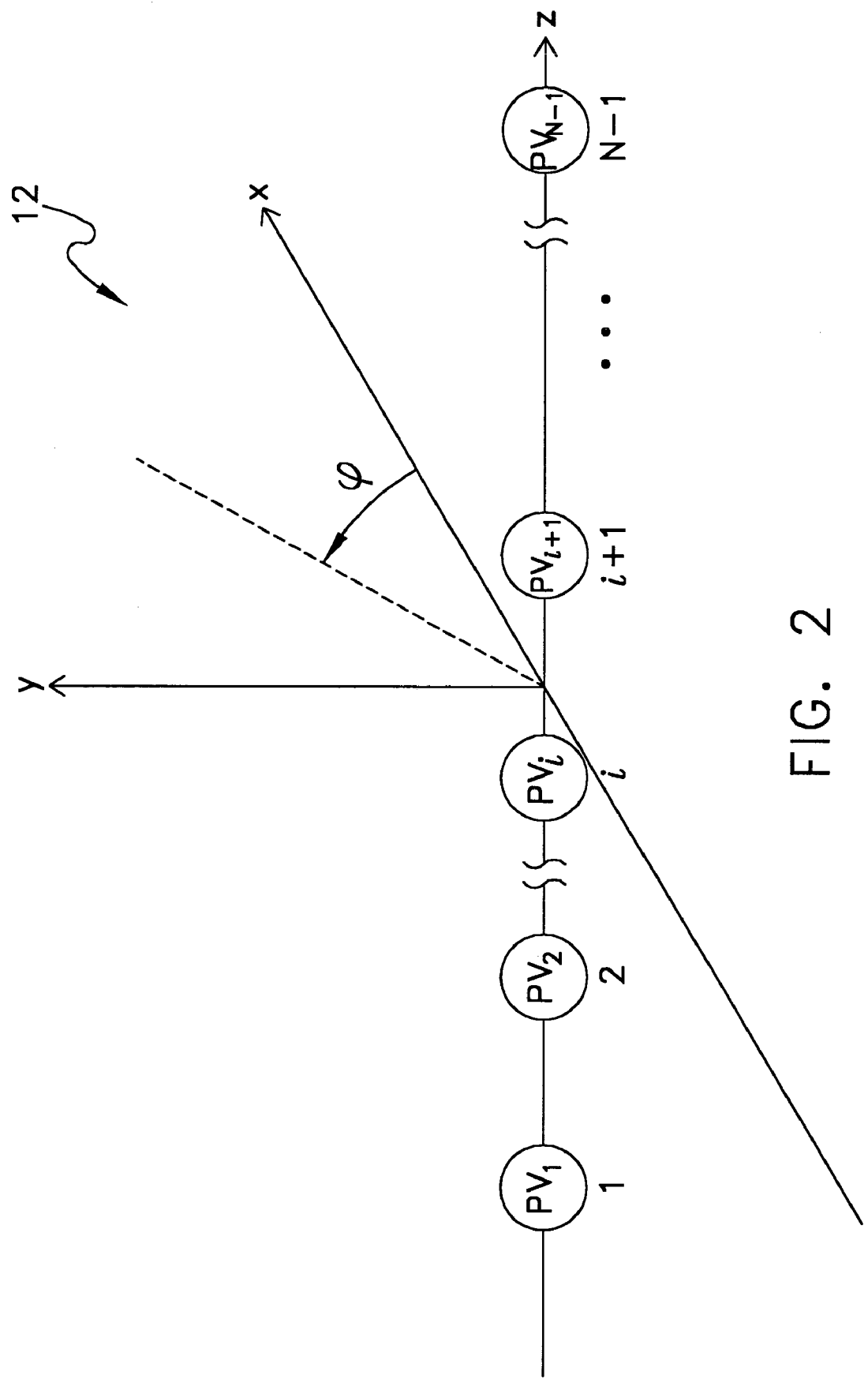
FIG. 2 illustrates a pressure-vector sensor line array.

Referring now to FIG. 2, there is illustrated in the preferred embodiment of the present invention, a line array 12 of N−1 pressure-vector (p-v) sensors $PV_1$ to $PV_{N-1}$ along a spatial axis labeled z. Each p-v sensor's vector component is aligned in the same direction. The angle, $\phi$, is the spatial angle measured away from the x-axis used to define the incident direction of an acoustic plane wave in a plane normal to the z axis and originating from a far field source. The pressure sensors are omni-directional and as such their individual output signal provides a directivity response $D_P=1$. Each vector sensor will have a dipole directivity along the oriented direction, which is taken to be one of the three directional axes. For simplicity only the x-axis will be referred to, however, all three axis can be used. The output signal of each vector sensor in the x-axis will provide a directivity response $D_{Vi}=\cos(\phi)$. In the prior art, using simple additive operations between the pressure and vector components within a single pressure-vector sensor, the directivity response of a single p-v sensor is expressed as $(aD_P+bD_V)$ wherein a and b are weighting or shading coefficients. This can then be expressed as $(a+b(\cos \phi))$.

Figure 3:
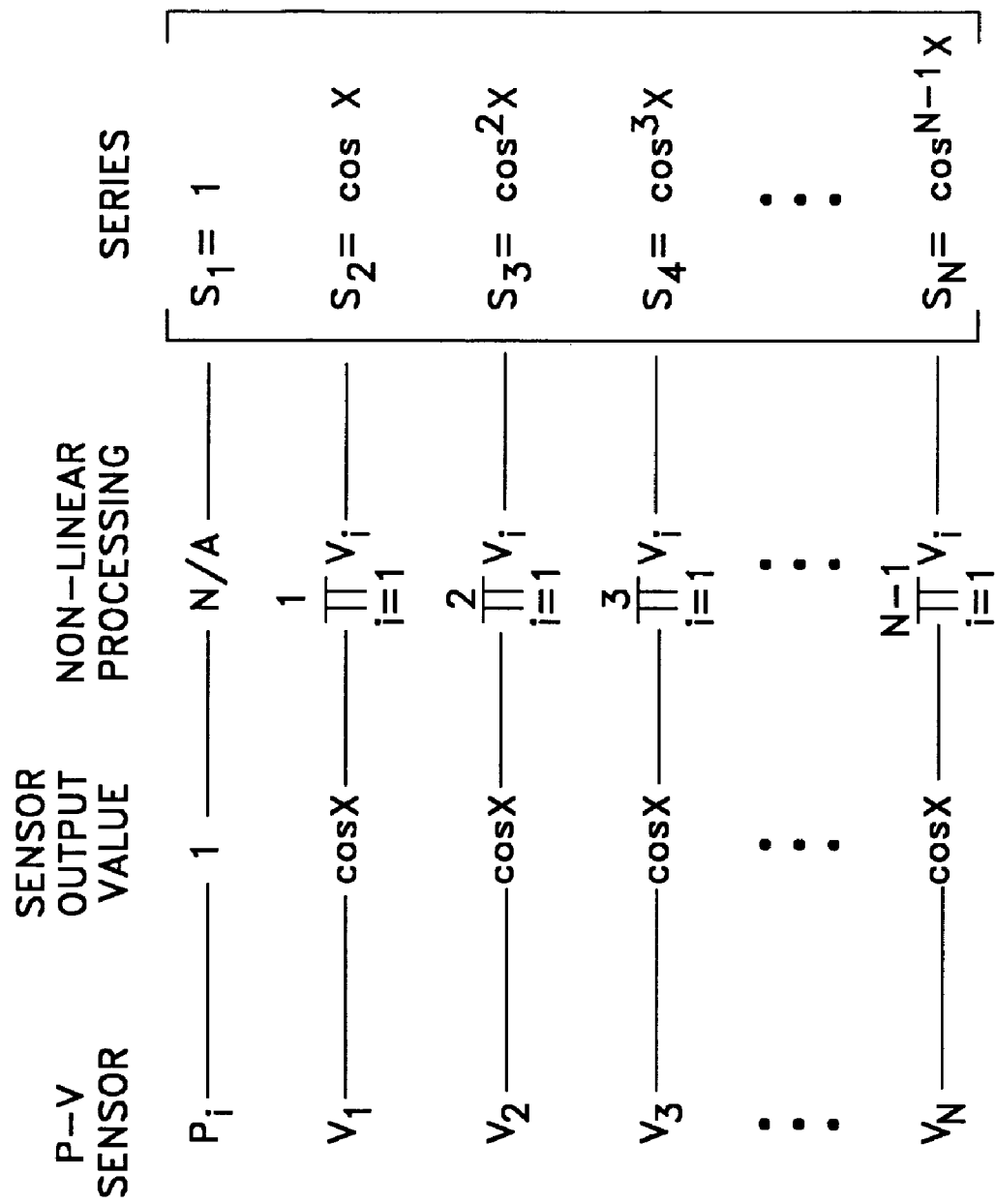
FIG. 3 illustrates the non-linear processing of sensor output into a mathematical series of N values.

In the present invention, to obtain the directivity response of the entire line array 12, the first step, as illustrated in FIG. 3, is to take the output signals of each p-v sensor, $PV_i$, (once again for simplicity the vector sensors are oriented along the x-axis, only the x-axis output of the vector sensor component will be used in the illustrative formulation) and perform non-linear processing of the output signals to form the series of N values, $[1, \cos X, (\cos X)^2, \ldots (\cos X)^{N-1}]$, where X represents the spatial angle $\phi$ as described above. Since all of the pressure components of the p-v sensors will give as their output a directivity response of 1, the output of all of the pressure components is given the value of 1 as the first value in the series. Because the acoustic plane wave is originating from a far field source, it is assumed that angle variation of spatial angle $\phi$ among the p-v sensors is negligible, and therefore the output signal of the vector component of each p-v sensor is cos X. The above series in turn serves as a basis for an N-dimensional mathematical Euclidean space.

The second step is to perform a mathematical transformation on the series. It is a well known fact that powers of angle arguments of cosine functions can be expressed as sums of multiple angle arguments of cosine functions, and that these standard formulas can constitute the basis for determining the elements of a transformation matrix. In the present invention, the basis for determining the elements of the transformation matrix is based on the fact that the expression cos(mX) can be expanded to Real(exp(imX)), which equals Real((cos X+i sin X)$^m$) for any value of m. This expansion is clearly referenced in the volume *Standard Mathematical Table and Formulae*, 30$^{th}$ Edition, CRC Press, 1996 which is incorporated by reference herein. A matrix defined by this expansion is used to link a mathematical transformation for an N-dimensional mathematical vector between the basis $[1, \cos X, (\cos X)^2, \ldots, (\cos X)^{N-1}]$ and $[1, \cos X, \cos 2X, \ldots, \cos((N-1)X)]$.

The next step is to apply one of several types of weighting or shading that are well known in the art, such as Dolph-Chebyshev, Taylor, Gaussian, Binomial or the like, depending upon the type of side-lobe suppression level sought for the pressure-vector sensor array 12.

Figure 4:
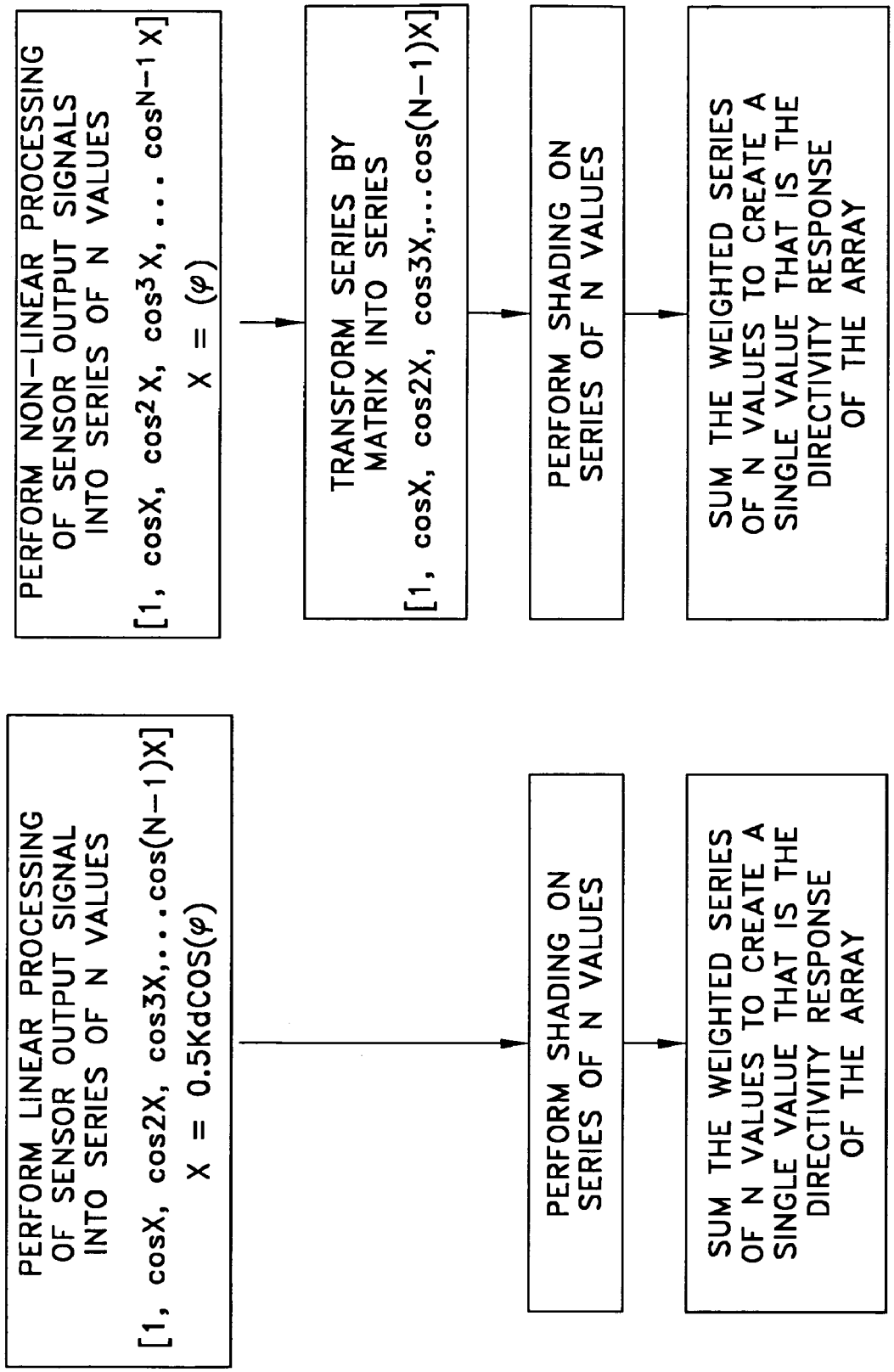
FIG. 4a illustrates a flow chart of the prior art method.
FIG. 4b illustrates a flow chart of the present non-linear method.

The final step involves a summation of the weighted values of the transformed series:

$$D(\varphi) = \left| \sum_{n=0}^{N-1} Bn \cos nX \right|$$

where Bn is the nth weighting or shading coefficient. The resulting sum of the N weighted values is the array directivity response, $D(\phi)$, of line array 12 that is then used in beam formation. The above method steps of the present invention are illustrated in the flow chart in FIG. 4b and contrasted with the prior art method steps illustrated in the flow chart in FIG. 4a.

Figure 5:
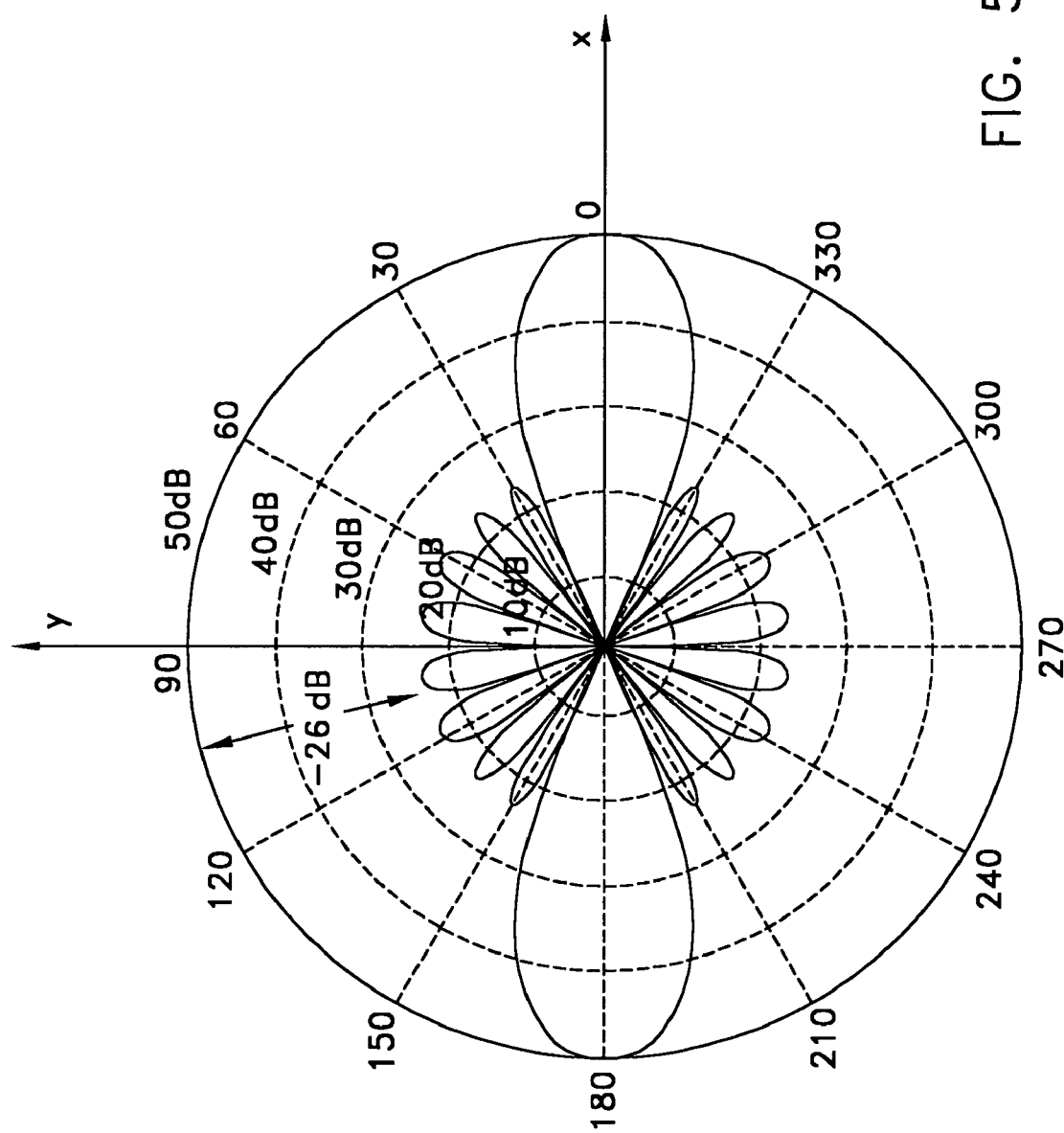
FIG. 5 illustrates a graphical display of the polar plot of the array directivity of a 10 element p-v sensor array using the method of the present invention and −26 dB Chebyshev weighting.

Referring to FIG. 5 there is illustrated a graphical display of the beams formed by plotting a polar plot of the array directivity $D(\phi)$ of a 10 element p-v sensor array using the present invention's method and −26 dB Chebyshev weighting. The circular plot indicates the possible angles of $\phi$ from zero to three hundred sixty degrees. The relative directivity response of the array varies from zero to fifty decibels as the angle $\phi$ varies. The response pattern clearly indicates the dipole response of the vector sensors as beams along the x axis, with a key goal being to have as narrow a pair of main response lobe beams as possible. In the situation where the p-v sensor array 12 is part of a larger Sonar system, the array directivity $D(\phi)$ is then processed further into the Energy Detector component of a Sonar system as is known in the prior art.

Figure 6:
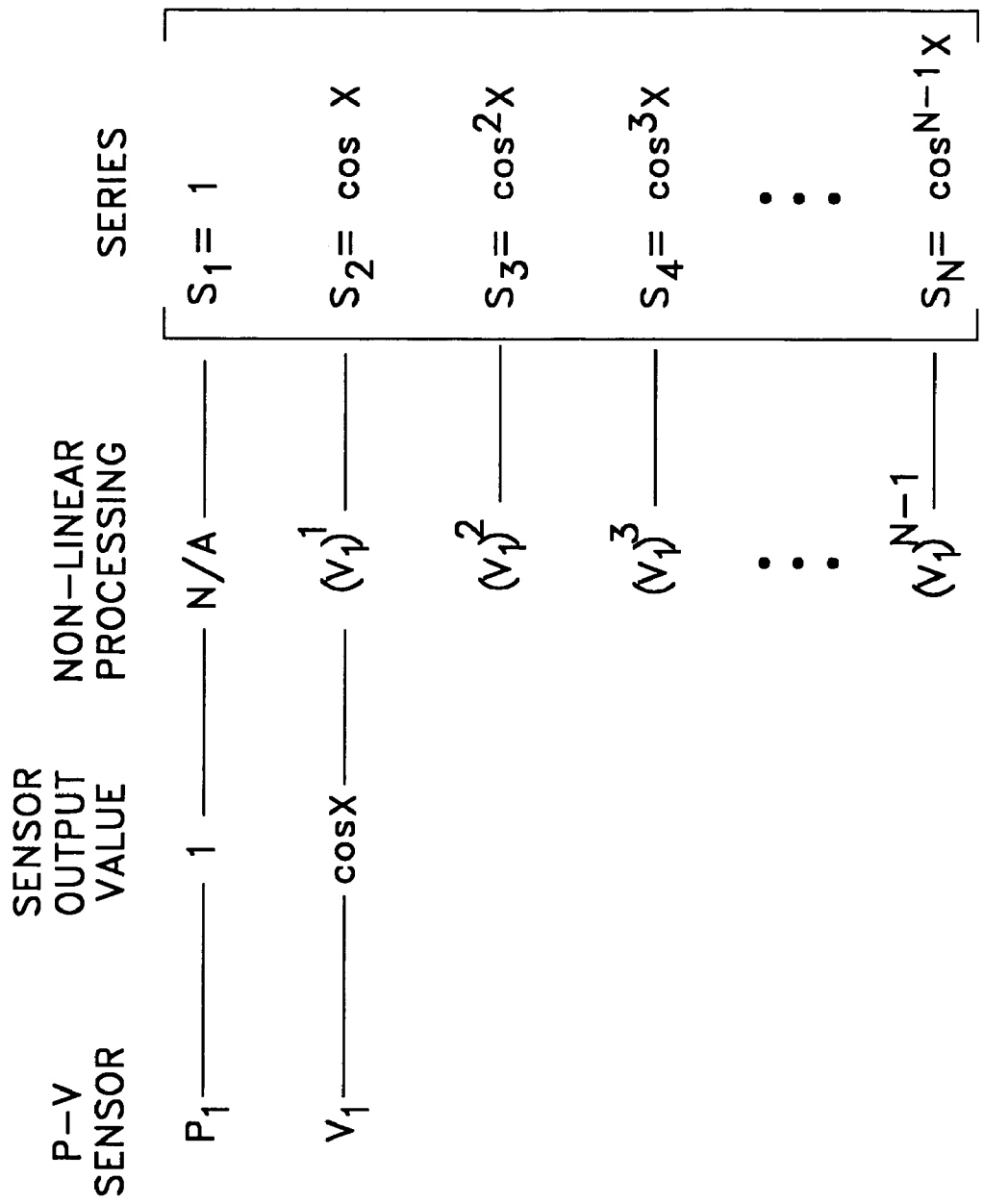
FIG. 6 illustrates the non-linear processing of sensor output into a mathematical series of N values for a single p-v sensor array having two sensor elements.

In an alternative embodiment, the same results can be achieved by using fewer p-v sensor elements of the p-v sensor array 12. The vector component of the sensor output can be recycled again and again to form the same series of N values $[1, \cos X, (\cos X)^2, \ldots, (\cos X)^{N-1}]$. For a p-v sensor array having only one p-v sensor element the non-linear processing on the sensor output is illustrated in FIG. 6. Because the same number of non-linear operations is used, this one-element p-v sensor array defines the same acoustic beam width as p-v sensor array 12 with N−1 p-v sensor elements. It should be noted, however, that an array with only one p-v sensor would not perform as well as a multiple p-v sensor array in regard to electrical or acoustic noise rejection.

The present invention is not however limited to use with a line array configuration, but can also be used for any geometrical type of array configuration such as planar, spatial, arc and spherical. The vector field information detected by the p-v sensors $PV_i$ can be either acoustic particle velocity or acceleration. In a preferred embodiment, the pressure-vector sensor array 12 is deployed underwater, however, the present invention is not limited to such a deployment.

The advantages of the present invention over the conventional half-wavelength element spacing array design are that nonlinear signal processing of acoustic pressure-vector sensor arrays exhibits superior aperture size reduction relative to a conventionally formed array of pressure sensors. In addition the acoustic beam width does not change when the acoustic frequency varies. This feature is extremely important for low frequency acoustic sonar applications. Another significant advantage is that these benefits are achieved without requiring conventional half-wave element spacing. The compactness of an N−1 element pressure-vector sensor array is restricted only by the physical size of each individual p-v sensor and its cabling.

The following example illustrates the size effect comparison between a pressure sensor array and pressure-vector sensor array where each array is deployed underwater as part of a sonar system. To achieve a 5-degree beam width at a frequency of 100 Hz, a conventional hydrophone array needs 600 feet of aperture. However, the same beam width can be achieved with an aperture size of only 3.3 feet using a pressure-vector sensor array, (assuming the spacing between the neighboring vector sensor elements is one inch), and when using the processing method of the present invention.

This invention has been disclosed in terms of certain embodiments. It will be apparent that many modifications can be made to the disclosed apparatus without departing from the invention. Therefore, it is the intent of the appended claims to cover all such variations and modifications as come within the true spirit and scope of this invention.

What is claimed is:

1. A method for calculating a directivity response from a plurality of sensor output signals of an N−1 element pressure-vector sensor line array, comprising the steps of:

performing a non-linear combination of the sensor output signal of each of the N−1 array elements in order to form a corresponding mathematical series [$S_1$, $S_2$, $S_3$, ... $S_N$] of N values, which serve as a basis for an N dimensional mathematical Euclidean space;

transforming said mathematical series [$S_1$, $S_2$, $S_3$, ... $S_N$] of N values according to a mathematical transformation matrix into a transformed series $$\begin{bmatrix} U_1 \\ U_2 \\ \vdots \\ U_N \end{bmatrix} = \begin{bmatrix} T_{11} & T_{12} & \ldots & T_{14} \\ T_{21} & T_{22} & \ldots & T_{24} \\ \vdots & \vdots & \vdots & \vdots \\ T_{N1} & T_{N2} & \ldots & T_{NN} \end{bmatrix} \begin{bmatrix} S_1 \\ S_2 \\ \vdots \\ S_N \end{bmatrix}$$

of N values;

weighting said transformed series [$U_1$, $U_2$, $U_3$, ... $U_N$] into a weighted transformed series [$B_1 U_1$, $B_2 U_2$, $B_3 U_3$, ... $B_N U_N$] of N values; and summing the N values in said weighted transformed series according to the formula $$\sum_{n=0}^{N-1} B_n U_n$$

to create a single value that is the array directivity response of said N−1 element pressure-vector sensor line array.

2. A method according to claim 1 wherein said step of performing a non-linear combination to form a mathematical series of N values comprises:

assigning the combined output of each pressure component of the N−1 pressure-vector sensors the value of 1 as the first value $S_1$ of the corresponding mathematical series of N values; and assigning the output of each vector component of the N−1 pressure-vector sensors $V_i$ in the sequence i=1 to N−1, to the corresponding value $S_{i+1}$ in the sequence i=1 to N−1 of the corresponding mathematical series of N values after processing each $V_i$ according to the formula $$S_{i+1} = \prod_{m=1}^{i} V_m$$

as i increases sequentially from 1 to N−1.

3. A method according to claim 2 wherein said mathematical series of values [$S_1$, $S_2$, $S_3$, ... $S_N$] is [1, cos X, (cos X)$^2$, ... (cos X)$^{N-1}$], where X represents the spatial angle, ϕ, measured away from the acoustic vector axis x.

4. A method according to claim 3 wherein said transformation matrix is defined by Real(exp(i(mX))), and is used to link a mathematical transformation for any N-dimensional mathematical vector between the basis [1, cos X, (cos X)$^2$, ... , (cos X)$^{N-1}$] and [1, cos X, cos 2X, ... , cos(N−1)X)].

5. A method according to claim 1 wherein weighting said transformed series is accomplished through an appropriate shading technology selected from at least one of Dolph-Chebyshev, Taylor, Gaussian, and Binomial.

6. A method according to claim 1 wherein all of the N−1 array elements are spaced an equal distance apart on the line array.

7. A method according to claim 1 wherein said N−1 element pressure-vector sensor line array is part of a larger sonar system having an energy detector component, and wherein said array directivity $$D(\varphi) = \left| \sum_{n=0}^{N-1} Bn \cos nX \right|$$

is expressed as a function of ϕ further comprising the step of:

processing the array directivity D(ϕ) into the energy detector component of said larger sonar system.

8. A method for calculating a directivity response from a sensor output signal of a single pressure-vector sensor, comprising the steps of:

performing a non-linear combination of the sensor output signal of the pressure-vector sensor in order to form a mathematical series [$S_1$, $S_2$, $S_3$, ... $S_N$] of N values, which serve as a basis for an N dimensional mathematical Euclidean space;

transforming said mathematical series [$S_1$, $S_2$, $S_3$, ... $S_N$] of N values according to a mathematical transformation matrix into a transformed series [$U_1$, $U_2$, $U_3$, ... $U_N$]

$$\begin{bmatrix} U_1 \\ U_2 \\ \vdots \\ U_N \end{bmatrix} = \begin{bmatrix} T_{11} & T_{12} & \ldots & T_{14} \\ T_{21} & T_{22} & \ldots & T_{24} \\ \vdots & \vdots & \vdots & \vdots \\ T_{N1} & T_{N2} & \ldots & T_{NN} \end{bmatrix} \begin{bmatrix} S_1 \\ S_2 \\ \vdots \\ S_N \end{bmatrix}$$

of N values;

weighting said transformed series [$U_1$, $U_2$, $U_3$, ... $U_N$] into a weighted transformed series [$B_1 U_1$, $B_2 U_2$, $B_3 U_3$, ... $B_N U_N$] of N values; and summing the N values in said weighted transformed series according to the formula $$\sum_{n=0}^{N-1} B_n U_n$$

to create a single value that is the directivity response of said pressure-vector sensor.

9. A method according to claim 8 wherein said step of performing a non-linear combination comprises;
assigning the combined output of each or a single pressure component of the pressure-vector sensor the value of 1 as the first value $S_1$ of the mathematical series of N values;
assigning the output of the vector component of the pressure-vector sensor $V_1$ to the remaining values $S_{i+1}$ in the sequence i=1 to N−1 of the corresponding mathematical series of N values according to the formula $S_{i+1}=V_1^i$ as i increases sequentially from 1 to N−1.

10. A method according to claim 9 wherein said mathematical series of N values $[S_1, S_2, S_3, \ldots S_N]$ is $[1, \cos X, (\cos X)^2, \ldots (\cos X)^{N-1}]$, where X represents the spatial angle, $\phi$, measured away from the acoustic vector axis x.

11. A method according to claim 10 wherein said transformation matrix is defined by Real(exp(i(mX))), and is used to link a mathematical transformation for any N-dimensional mathematical vector between the basis $[1, \cos X, (\cos X)^2, \ldots, (\cos X)^{N-1}]$ and $[1, \cos X, \cos 2X, \ldots, \cos((N-1)X)]$.

12. A method according to claim 8 wherein weighting said transformed series is accomplished through an appropriate shading technology selected from at least one of Dolph-Chebyshev, Taylor, Gaussian, and Binomial.

13. A method according to claim 8 wherein said pressure-vector sensor is part of a larger sonar system having an energy detector component, and wherein said directivity $$D(\varphi) = \left| \sum_{n=0}^{N-1} Bn \cos nX \right|$$

is expressed as a function of $\phi$ further comprising the step of:
processing the array directivity $D(\phi)$ into the energy detector component of said larger sonar system.

* * * * *